Patented Mar. 8, 1949

2,463,742

UNITED STATES PATENT OFFICE 2,463,742

KETONES

Alva C. Byrns, Oakland, Calif., assignor to Union Oil Company of California, Los Angeles, Calif., a corporation of California No Drawing. Application November 22, 1943, Serial No. 511,317

9 Claims. (Cl. 260—586)

This invention relates to the production of ketones, and particularly to the production of unsaturated ketones by a catalyzed liquid phase reaction between unsaturated hydrocarbons and organic acid anhydride derivatives. This is a continuation-in-part of my copending application, Serial No. 392,095, now Patent No. 2,355,703, dated August 15, 1944.

It is shown in United States Patent No. 2,315,046 that unsaturated ketones may be prepared by a liquid phase reaction between olefins and carboxylic acid anhydrides in the presence of zinc chloride or sulfuric acid catalysts. It has now been found that certain other catalysts, especially hydrogen fluoride and boron fluoride, are usually effective in this type of reaction, and that similar reactions may be carried out wherein olefins or other unsaturated organic compounds may be reacted with organic acid derivatives in the liquid phase, in the presence of these and other catalysts.

It is an object of the present invention to provide a novel process for the production of ketones.

The preferred process of this invention involves mixing the reactants in the liquid phase and contacting the mixture with a small amount (less than one mol per mol of either reactant) of the gaseous HF or BF$_3$ catalyst.

The olefinic hydrocarbons employed in this process are mono-olefins, prefereably cyclic or branched chain acyclic olefins, although straight chain olefins may also be reacted under somewhat more strenuous conditions. The low molecular weight hydrocarbons containing 4 to about 12 carbon atoms are preferred, especially when reacted in the presence of the milder catalysts shown below, but these as well as lower and higher molecular weight olefins, may also be used. As examples of the preferred branched chain olefins, I may cite isobutylene, diisobutylene, 2,-3,-dimethyl pentene and the like, and especially those hydrocarbon mixtures known as polymer gasoline, prepared by polymerization of normally gaseous olefins. This term is also intended to cover naphthenic substituted olefins such as 1- or 2-cyclohexylpropene and the like. Cyclic olefins include cyclohexene, dimethyl cyclopentene, and the like. Straight chain olefins include ethylene, n-butene, n-octene and the like.

The organic acid derivatives with which the above olefinic hydrocarbons may be reacted are preferably derivatives of the mono-carboxylic acids having at least two C atoms, such as acetic, propionic, butyric, cyclohexyl butyric, phenyl acetic, and the like, these derivatives including the acid anhydrides, and the ketenes, such as ketene, methyl ketene, ethyl ketene, 2-cyclohexylethyl ketene, and phenyl ketene, respectively, which correspond to the above acids. The derivatives of polycarboxylic acids such as maleic, succinic and the like may also be employed in some instances. The derivatives of the mono-carboxylic acids having 2 to about 6 carbon atoms, especially acetic acid derivatives, are preferred, although derivatives of higher acids may be employed in some cases.

When preparing ketones by use of the preferred HF or BF$_3$ catalyst, it is preferable to mix the reactants, i. e., the unsaturated organic compound and the organic acid anhydride derivative, and contact the mixture with a small amount of the gaseous catalyst. This minimizes the side reaction of polymerization of the reactants. Other methods may be used, however.

As a specific example of the process of this invention, 1.0 mol of commercial di-isobutylene was mixed with 1.0 mol of acetic anhydride and cooled to about 0° C., after which gaseous BF$_3$ was bubbled slowly into the mixture while stirring vigorously. After a period of about one hour of this type of operation, wherein about 0.15 mol of BF$_3$ catalyst had been bubbled through the mixture, and only a small amount of the catalyst had been lost or reacted with the reactants, the operation was discontinued, and the reaction mass was distilled to obtain a mixture containing about 0.41 mol of ketones as described below, mixed with unreacted reactants and a small amount of catalyst, and a small amount of products of side reactions such as polymerization.

The unsaturated ketone produced in the above operation was separated from the reaction product by distillation and was found to be a mixture composed predominantly of two methyl octenyl ketone isomers having the following structures:

(I)

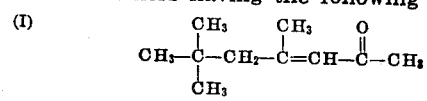

(II)

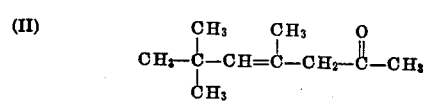

The alpha-beta unsaturated isomer I predominated, but there was a considerable proportion of form II also present, as well as small amounts of related isomers. The reason for this production of various isomers is that the di-isobutylene feed is a mixture of isomers itself, and there is a possibility of some catalytic isomerization of either the feed or the products during the course of the reaction.

Other ketones may be produced by similar reactions between other olefinic hydrocarbons and organic acid anhydrides and other catalysts as described above. The reaction temperature required may be between about −50° C. and about +200° C. The pressure may be atmospheric or above if necessary, to keep the reactants in the liquid phase; or pressures below atmospheric may be employed, as long as the reaction is essentially liquid phase. For $BF_3$ the pressure and temperature are preferably low, such as about atmospheric pressure, and −50° C. to +100° C. temperature and for HF the pressures are preferably about 50 to 250 pounds gage, and the temperature 0° C. to 200° C. The ratio of acid anhydride to olefinic hydrocarbon is preferably about 1 to 1, although higher or lower ratios may be employed.

The reaction between the olefinic hydrocarbon and the acid anhydride may be represented as follows:

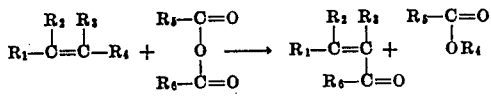

where $R_1$, $R_2$, $R_3$, and $R_4$ may be hydrogen or hydrocarbon radicals and $R_5$ and $R_6$ are hydrocarbon radicals. The reaction proceeds more readily when $R_4$ is hydrogen and the other R's are hydrocarbon radicals. In this case it is apparent that the organic acid is formed as a byproduct.

The organic acid such as the byproduct noted above, may be reacted with a ketene to form the anhydride, as in the following example:

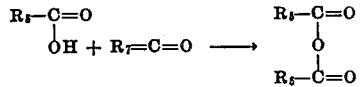

where $R_7$ is similar to $R_5$, but lacks one more hydrogen on its terminal carbon atom. It has been found that this reaction will take place under the same conditions as the above reaction between the anhydride and the olefinic hydrocarbon to form the unsaturated ketone. This makes it possible to carry out the above process of making these ketones, in the presence of the acid and the ketene, as well as in the presence of the anhydride as described. In fact, since the acid is the by-product of the anhydride reaction, the ketone-forming reaction may be carried out simply by continuously adding the ketene and the olefinic hydrocarbon to the reaction mixture.

The separation of the ketones from the reaction product may usually be readily accomplished by fractional distillation, especially if narrow-boiling fractions or pure compounds are employed as the unsaturated compounds. It is also possible to use other conventional methods of separation, however, such as extractive distillation, azeotropic distillation and solvent extraction.

Other modifications of the invention which would occur to one skilled in the art are to be considered as part of the invention as defined in the following claims.

I claim:

1. A process for the production of ketones which comprises reacting an unsaturated hydrocarbon with an organic acid derivative selected from the class consisting of organic acid anhydrides and ketenes, in the liquid phase in the presence of a catalyst selected from the class consisting of hydrogen fluoride and boron fluoride.

2. A process according to claim 1 in which the unsaturated hydrocarbon is a cyclic olefin.

3. A process for the production of ketones which comprises reacting a branched chain olefin with an organic acid derivative selected from the class consisting of organic acid anhydrides and ketenes, in the liquid phase in the presence of a catalyst selected from the class consisting of hydrogen fluoride and boron fluoride.

4. A process according to claim 3 in which the organic acid derivative is an anhydride of a mono-carboxylic acid having between 2 and 6 carbon atoms.

5. A process for the production of unsaturated ketones which comprises reacting a branched chain mono-olefin with acetic anhydride in the liquid phase at a temperature between about −50° C. and +200° C. in the presence of a catalyst selected from the class consisting of hydrogen fluoride and boron fluoride.

6. A process according to claim 5 in which the catalyst is boron trifluoride.

7. A process according to claim 5 in which the catalyst is hydrogen fluoride.

8. A process according to claim 1 in which the organic acid derivative is an anhydride of a mono-carboxylic acid having between 2 and about 6 carbon atoms.

9. A process according to claim 1 in which the organic acid derivative is the ketene of a mono-carboxylic acid having between 2 and about 6 carbon atoms.

ALVA C. BYRNS.

REFERENCES CITED

The following references are of record in the file of this patent:

UNITED STATES PATENTS

| Number | Name | Date |
| --- | --- | --- |
| 2,210,837 | Kastner | Aug. 6, 1940 |
| 2,315,046 | Byrns | Mar. 30, 1943 |

OTHER REFERENCES

Jones, "Jour. Chem. Soc.," vol. 95, pages 1904–1909 (1909).